United States Patent Office 3,539,566
Patented Nov. 10, 1970

3,539,566
HALOGENATED TRIAZINYL DERIVATIVES OF FLUORINATED AMIDES
Richard F. Sweeney, Randolph Township, Morris County, and Alson K. Price, Morristown, N.J., assignors to Allied Chemical Corporation, New York, N.Y., a corporation of New York
No Drawing. Filed Aug. 1, 1968, Ser. No. 749,301
Int. Cl. C07d 55/18
U.S. Cl. 260—249.5
13 Claims

ABSTRACT OF THE DISCLOSURE

Halogenated triazinyl derivatives of fluorinated amides useful as oil- and water-repellency agents have the structural formula

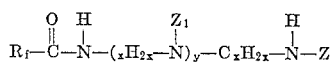

wherein $x$ and $y$ are integers from 2 to 6 and 1 to 4, respectively; wherein $R_f$ is a perfluoroalkyl or a fluorinated isoalkoxyalkyl radical; Z is H, alkyl, hydroxyalkyl, a fluorinated acyl radical $R_fCO$— wherein $R_f$ is as described above, or a halogenated triazinyl radical; $Z'$ is H, alkyl, hydroxyalkyl, a fluorinated acyl radical $R_fCO$— wherein $R_f$ is as described above, a halogenated triazinyl radical or a radical having the formula $-C_xH_{2x}NHZ$ wherein $x$ and Z are as described above, there being at least one fluorinated acyl radical $R_fCO$— and at least one halogenated triazinyl radical in the molecule represented by Z and/or $Z'$.

BACKGROUND OF THE INVENTION

This invention is directed to a new class of fluorocarbon derivatives and to their application to textiles, paper and other fibrous materials to produce oil- and water-repellent products. More particularly, this invention relates to reaction products of fluorinated polyamide compounds with halogenated triazine compounds, to treatment of textiles, paper and other fibrous materials therewith to render the same oleophobic and hydrophobic, and to textiles, paper and other fibrous products treated therewith so as to have been rendered oil- and water-repellent.

It is known to employ certain fluorochemicals in the treatment of textiles, paper and other fibrous products to impart thereto oil- and water-repellency properties. In general, these fluorochemicals are composed of a fluorinated alkyl chain affixed to an active functional group. The oleophobic and hydrophobic properties of the fluorochemicals are attributed, at least in part, to the inherent low surface energy of the fluorinated surface provided by the fluorinated alkyl chain. The portion of the molecule to which the fluorinated alkyl chain is affixed provides the physical and chemical bond between the fluorinated alkyl chain and the substrate surface. This bond not only influences the degree of orientation and packing of the fluorinated groups of the fluorinated alkyl chain, and hence, the oil- and water-repellency properties of the fluorochemical, but in particular, determines the durability of the oleophobic and hydrophobic properties obtained. There is always a need for new oil- and water-repellency agents, particularly for those which are not only capable of obtaining high levels of oil- and water-repellency, but are also capable of maintaining oleophobic and hydrophobic properties of substrate surfaces treated therewith after their repeated exposure to laundering.

Accordingly, one object of the present invention is the provision of novel fluorocarbon derivatives.

Another object is to provide oil- and water-repellent compositions of novel fluorocarbon derivatives suitable for treating fibrous materials, such as paper and textiles, particularly cellulosic materials, to impart thereto oleophobic and hydrophobic properties.

A still further object is to provide methods for the treatment of textiles, paper and other fibrous products employing said fluorocarbon derivatives.

A further object is to provide textile and paper materials treated with the fluorocarbon derivatives of the present invention.

An additional object of the present invention is the provision of cellulosic materials chemically modified with the novel fluorocarbon derivatives.

These and other objects will be apparent from the following description.

DESCRIPTION OF THE INVENTION

In accordance with the invention, reaction products of fluorinated polyamide compounds with halogenated triazine compounds have been found to impart to textiles, paper and other fibrous products durable oil- and water-repellency properties.

The compounds proposed for use as oil- and water-repellency agents conform to the general formula:

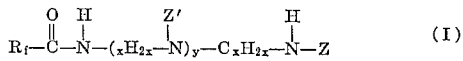 (I)

wherein (1) $R_f$ is a radical selected from the group consisting of
  (a) perfluoroalkyl having from 3 to 17 carbon atoms, and
  (b) a radical having the formula

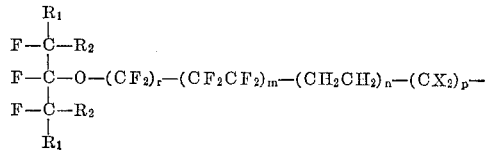

wherein
  (i) $R_1$ and $R_2$ are fluorine or are fluoroalkyl groups, or when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups,
  (ii) $m$ and $n$ are each integers of from 0 to 20, with the proviso that the sum of $m$ and $n$ is from 0 to 20, and provided further that when $r$ is 0, $m$ is at least 1,
  (iii) X is selected from the group consisting of hydrogen and fluorine, with the proviso that when $n$ is greater than 0, then X is always hydrogen,
  (iv) $p$ is 0 or 1,
  (v) $r$ is 0 or 1, with the proviso that when the sum of $m$, $n$ and $p$ is greater than 0, then $r$ is always 0,
(2) $x$ is an integer from 2 to 6,
(3) $y$ is an integer from 1 to 4,
(4) Z is a member selected from the group consisting of
  (a) hydrogen,
  (b) alkyl having from 1 to 6 carbon atoms,
  (c) a radical having the formula —ROH wherein R is a divalent alkylene bridging group containing from 1 to 6 carbon atoms,
  (d) a fluorinated acyl radical having the formula

wherein $R_f$ has the afore-stated meaning, and (e) a halogenated triazinyl radical having the formula

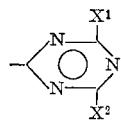

in which $X^1$ and $X^2$ are independently selected from the group consisting of fluorine, chlorine and bromine, and (5) $Z'$, which may be the same or different in different

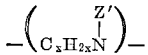

groups, is a member selected from the group consisting of
(a) hydrogen,
(b) alkyl having from 1 to 6 carbon atoms,
(c) a radical having the formula —ROH wherein R is a divalent alkylene bridging group containing from 1 to 6 carbon atoms,
(d) a fluorinated acyl radical having the formula

wherein $R_f$ has the afore-stated meaning,
(e) a halogenated triazinyl radical having the formula

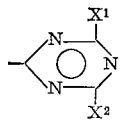

in which $X^1$ and $X^2$ have the afore-stated meanings, and
(f) a radical having the formula

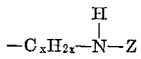

wherein $x$ and $Z$ have the afore-stated meanings, with the proviso that at least one of $Z$ or $Z'$ is a fluorinated acyl radical or one of $Z'$ is a radical having the formula

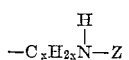

wherein $Z$ is a fluorinated acyl radical, and at least one of $Z$ or $Z'$ is a halogenated triazinyl radical or one of $Z'$ is a radical having the formula

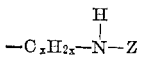

wherein $Z$ is a halogenated triazinyl radical, said fluorinated acyl radical and halogenated triazinyl radical having the afore-stated formulas.

The novel fluorocarbon derivatives of the present invention are prepared by reacting a fluorinated polyamide starting material as hereinbelow defined with a halogenated tiazine reactant at temperatures between about 0° C. to about 160° C. preferably in the presence of an inert organic solvent.

The halogenated triazine reactant employed in the preparation of the novel fluorocarbons of the present invention is represented by the formula

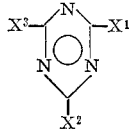

wherein $X^1$, $X^2$ and $X^3$ are independently selected from the group consisting of fluorine, chlorine and bromine. Cyanuric chloride, cyanuric fluoride, cyanuric bromide, 2-chloro-4,6-difluoro triazine, 2-bromo-4,6-dichloro triazine, 2-chloro-4,6-dibromo triazine, 2-fluoro-4,6-dibromo triazine and 2-bromo-4,6-difluoro triazine are illustrative of suitable halogenated triazine reactants.

The fluorinated polyamide reactant suitable for reaction with the above halogenated triazine reactants is characterized by the structural formula

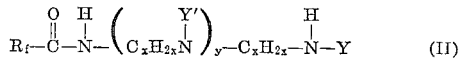 (II)

wherein $R_f$, $x$ and $y$ have the above-stated meanings; Y is a member selected from the group consisting of hydrogen, alkyl having from 1 to 6 carbon atoms, a radical having the formula —ROH wherein R has the above-stated meaning and a fluorinated acyl radical having the formula

wherein $R_f$ has the above-stated meaning; and $Y'$, which may be the same or different in different

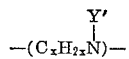

groups, is a member selected from the group consisting of hydrogen, alkyl having from 1 to 6 carbon atoms, a radical having the formula —ROH wherein R has the above-stated meaning, a fluorinated acyl radical having the formula

wherein $R_f$ has the above-stated meaning and a radical having the formula

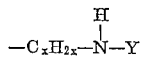

wherein $x$ and $Y$ have the above-stated meanings, with the proviso that at least one of Y or $Y'$ is a fluorinated acyl radical or one of $Y'$ is a radical having the formula

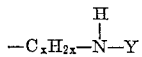

in which $x$ is as stated above and Y is a fluorinated acyl radical, said fluorinated acyl radical having the afore-stated formula, and at least one of Y or $Y'$ is hydrogen.

The fluorinated polyamide reactant of Formula II, above, is prepared by reaction of a fluorinated carboxylic acid having the formula $R_fCOOH$ wherein $R_f$ has the afore-stated meaning, or a derivative thereof, such as an ester, anhydride or acid halide thereof with a polyalkylene polyamine compound corresponding to the general formula

 (III)

wherein $x$ and $y$ have the afore-stated meanings; wherein Q is selected from the group consisting of hydrogen, alkyl having from 1 to 6 carbon atoms, and a radical having the formula —ROH wherein R has the afore-stated meaning; and wherein $Q'$ is selected from the group consisting of hydrogen, alkyl having from 1 to 6 carbon atoms, a radical having the formula —ROH wherein R has the afore-stated meaning, or an aminoalkyl radical having the formula $-C_xH_{2x}NHQ$ wherein $x$ and Q have the afore-stated meanings; there being at least two hydrogen atoms in the molecule represented by Q and/or $Q'$.

The polyalkylene polyamine reactants of Formula III, above, employed in the preparation of the fluorinated polyamide compounds of Formula II, above, as a class, are known compounds. These reactants may be straight-chain or branched-chain compounds and may be used in the form of a single compound, as a mixture of isomers or as a mixture of polyamines containing from 3 to 6 nitrogen atoms in the molecule. Specific examples of polyalkylene polyamines employable herein include di-ethylene triamine, di-n-propylene triamine, di-i-butylene triamine, di-n-hexylene triamine, triethylene tetramine, tri-i-propylene tetramine, tri-n-hexylene tetramine, 4-(2-aminoethyl)-1,4,7-triazaheptane, tetraethylene pentamine, tetra-n-propylene pentamine, tetra-n-butylene pentamine, 4-(2-aminoethyl)-1,4,7,10-tetraazadecane, tetra-n-hexylene pentamine, pentaethylene hexamine, 1-(hydroxylethyl) - 4 - methyl - 1,4,7 - triazaheptane, 1,4 - dimethyl-8 - (6 - hydroxylene) - 1,4,8,12 - tetraazododecane, 1 - (6 - hydroxyhexyl) - 6,11,16 - trimethyl - 1,6,11,16,21, pentaazaheneicosane, 1,4,7, - tris(2 - hyroxyethyl)-1,4,7,10 - tetraazadecane, 4,7 - dimethyl - 1,4,7,10-tetraazadecane, and 1 - methyl - 1,5,9-triazanonane. These polyalkylene polyamines can be prepared by standard methods known to those skilled in the art. Preferred polyalkylene polyamines are diethylene triamine, dipropylene triamine, triethylene tetramine and tetraethylene pentamine since these are the more readily commercially available compounds.

Fluorinated carboxylic acid reactants, above described, wherein $R_f$ is perfluoroalkyl, suitable for reaction with the above polyalkylene polyamine reactants are saturated straight-chain or branched-chain monocarboxylic acids or stated derivatives thereof containing from 4 to 18 carbon atoms in the acid portion of the molecule. Discrete molecular species of the perfluorocarboxylic acid reactants may be used or mixtures of these reactants in various proportions having the indicated carbon chain length may be employed. Illustrative perfluorocarboxylic acid reactants include perfluorobutyric, perfluorocaproic, perfluorocaprylic, perfluorolauric, perfluoromyristic, perfluoropalmitic, and perfluorostearic acids, as well as various isomeric forms thereof.

Perfluorocarboxylic acid reactants herein contemplated containing up to about ten carbon atoms are readily prepared by the electrochemical fluorination of alkanoic acids in anhydrous hydrogen fluoride with subsequent hydrolysis of the resulting fluorinated acid fluorides, as disclosed in U.S. Pat. 2,567,011, issued Sept. 4, 1951. Longer chain perfluorocarboxylic acid reactants, i.e. those containing from about 11 to 18 carbon atoms, may be obtained by reaction of perfluoroalkyl iodides with oleum containing about 15% to 45% sulfur trioxide at elevated temperatures followed by hydrolysis of the resulting perfluorocarboxylic acid fluoride, as disclosed in French Pat. 1,343,601 of Oct. 14, 1963.

Fluorinated carboxylic acid reactants, above described, wherein $R_f$ is a radical having the formula

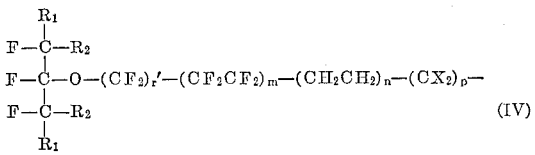

wherein $R_1$, $R_2$, X, $r$, $n$, $m$ and $p$ have the afore-stated meanings may be prepared by various hereinafter described methods.

Fluorinated carboxylic acids of the formula $R_fCOOH$ wherein $R_f$ has the Formula IV, above, wherein $r$ is 0, $m$ is at least 1 and the sum of $n$ and $p$ is at least 1, can be prepared from telomers having the general formula

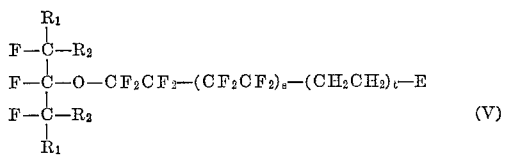

wherein $R_1$ and $R_2$ have the afore-stated meanings, wherein $s$ and $t$ are each integers from 0 to 20, the sum of $s$ and $t$ being at least 1, and wherein E is a halogen selected from the group consisting of Br and I. Telomers of that type and their preparation are described in commonly assigned copending application of Anello et al. entitled, "Telomers and Process for the Preparation Thereof," Ser. No. 633,359, filed Apr. 25, 1967, the pertinent subject matter of which is hereby incorporated by reference. By way of general description, these telomers are prepared by radical addition reactions of polyfluoroisoalkoxyalkyl halide telogens of the formula

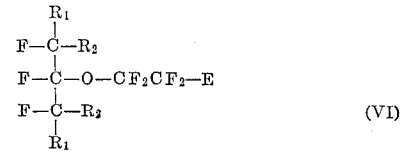

wherein $R_1$, $R_2$ and E have the afore-stated meanings, with telomerizable unsaturated compounds. The telomerization reaction may be initiated by heat or by means of a free radical initiating catalyst. The polyfluoroisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluorine or chlorine and an olefin. Preparation of the telogen starting materials is described in detail in copending applications of Litt et al., "Fluorinated Ethers," U.S. Ser. No. 492,276, filed Oct. 1, 1965, now U.S. Pat. 3,453,333 and 513,574, filed Dec. 13, 1965, the pertinent subject matter of which is hereby incorporated by reference.

Fluorinated carboxylic acids of the formula $R_fCOOH$ wherein $R_f$ has the Formula IV, above, wherein $r$, $n$ and $p$ are all 0 and wherein $m$ is at least 2 may be prepared by reacting the corresponding telomer represented by general Formula V, above, wherein $t$ is 0 with ICN or $(CN)_2$ to form the nitrile, followed by hydrolysis of the nitrile in known manner to form the free acid. The reaction between the telomer and the ICN or $(CN)_2$ to form the nitrile is carried out under superatmospheric pressure above about 20 to 200 atmospheres or more at temperatures in excess of about 300° C., preferably using an excess of the ICN or $(CN)_2$ reactant. Hydrolysis of the nitrile to form the free acid can be effected by treatment with aqueous mineral acid, such as hydrochloric, phosphoric, or sulfuric acid, at temperatures between about 60° C. and about 125° C.

Fluorinated carboxylic acids of the formula $R_fCOOH$ wherein $R_f$ has the Formula IV, above, wherein $m$ is at least 1, $p$ and $r$ are both 0 and $n$ is greater than 0 may be prepared by reacting the corresponding telomer represented by Formula V, above, wherein $t$ is greater than 0 with an alkali metal cyanide to form the nitrile, followed by hydrolysis of the nitrile to form the free acid, as described above. The reaction between the telomer and the alkali metal cyanide is preferably carried out in aqueous alcoholic solution at temperatures between about 60° C. and about 100° C.

Fluorinated carboxylic acids of the formula $R_fCOOH$ wherein $R_f$ has the Formula IV, above, wherein $m$ is at least 1, $r$ is 0, $p$ is 1 and X is hydrogen, can be prepared by reacting the corresponding telomer represented by general Formula V, above, wherein $t$ is at least 1 with $SO_3$ to form the corresponding pyrosulfate, or with oleum to form the corresponding hydrosulfate, hydrolysis of the pyrosulfate or the hydrosulfate with aqueous acid to form the corresponding alcohol, followed by oxidation of the alcohol with dichromate, permanganate or strong nitric acid to form the free acid.

Fluorinated carboxylic acids of the formula $R_fCOOH$ wherein $R_f$ has the Formula IV, above, wherein $m$ is at least 1, $r$ and $n$ are both 0, $p$ is 1 and X is fluorine can be prepared by reacting a corresponding telomer represented by Formula V, above, wherein $t$ is 0 with $SO_3$ to form corresponding acid halides and fluoropyrosulfates, and hydrolyzing the acid halides and fluoropyrosulfates by refluxing with water to obtain the corresponding free acids.

Fluorinated carboxylic acids of the formula $R_fCOOH$ wherein $R_f$ has the Formula IV, above, wherein $r$ is 1 and $m$, $n$ and $p$ are all 0, can be prepared by the same method from polyfluoroisoalkoxylkyl halide compounds of Formula VI, above.

Fluorinated carboxylic acids of the formula $R_fCOOH$ wherein $R_f$ has the Formula IV, above, wherein $m$ is 1 and $r$, $n$ and $p$ are all 0 can be prepared from polyfluoroisoalkoxyalkyl halide compounds of Formula IV, above, by reacting them with a Grignard reagent to form a magnesium halide adduct, reacting this adduct with $CO_2$ to form a magnesium halide salt, and then acidifying the salt to obtain the desired acid. The reactions involving the Grignard reagent and the carbon dioxide proceed very rapidly and can be conducted at temperatures considerably below 0° C. Preparation of these acids is described in detail in U.S. Pat. 3,453,333 mentioned supra.

The esters and acid halides of the above-described acids may be prepared from the acids by conventional procedures.

While the telomers of Formula V, above, and the fluorinated carboxylic acid reactants derived therefrom, may be prepared as discrete compounds, they are generally obtained as mixtures of compounds of varying chain length. It is to be understood that both the individual discrete fluorinated carboxylic acid reactants as well as their mixtures of compounds of varying chain length are suitable for the preparation of the fluorinated amide compounds employed in the preparation of the compounds of the present invention.

Preparation of above-described acids wherein $R_f$ has the Formula IV, above, is described in more detail in commonly assigned co-pending applications of Anello et al., U.S. Ser. Nos. 721,115 and 721,117, both filed Apr. 12, 1968, respectively entitled "Fluorocarbon Acids and Derivatives" and "Fluorocarbon Compounds," the pertinent subject matter of which applications is hereby incorporated by reference.

The fluorinated polyamide reactants of Formula II, above, may be prepared by simply mixing the fluorinated carboxylic acid reactant with the polyalkylene polyamine starting material of Formula III, above. These reactants may be charged in a molar proportion of 1 mol of polyalkylene polyamine to about 1 to 7 mols of fluorinated carboxylic acid reactant. If desired, the reaction may be carried out in the presence of a suitable inert organic solvent. Suitable reaction temperatures range between about 0° C. to about 200° C. Upon conclusion of the reaction, the desired fluorinated polyamide compound may be recovered from the recation mixture by methods known to those skilled in the art.

The reaction product, obtained as a result of the reaction of the fluorinated carboxylic acid reactant and the polyalkylene polyamine reactant above described, may comprise a single compound conforming to the above-stated structural Formula II, a mixture of isomers thereof or a reaction mass composed of amide products containing two or more amide functions depending upon the polyalkylene polyamine reactant employed, the reactivity of the fluorinated carboxylic acid reactant present, the solubility of the amide product obtained during the reaction in the reaction mixture and the molar proportions of fluorinated carboxylic acid reactant employed. The resulting fluorinated polyamide product, whether it comprises a single compound, a mixture of isomers thereof or a mass composed of amide products containing two or more amide functions, is suitable without further purification for reaction with the halogenated triazine reactant, above described, to form the fluorocarbon derivatives of the present invention. However, if desired, the fluorinated polyamide may be further purified prior to reaction with the halogenated triazine reactant, as by distillation or recrystallization using any commonly employed inert organic solvent such as acetonitrile or chloroform.

DESCRIPTION OF THE PREFERRED EMBODIMENTS

The novel fluorocarbon derivatives of this invention are prepared by reacting the halogenated triazine compound with the fluorinated polyamide starting material, above described. These reactants may be charged in a mol proportion of 1 mol of fluorinated polyamide to about 1 to 10, preferably about 2 to 4, mols of halogenated triazine reactant. The reaction temperature and time are dependent upon the particular fluorinated polyamide and halogenated triazine reactants involved. The temperature ranges from about 0° C. to 160° C., preferably about 10° C. to 60° C. The reaction is quite rapid even at about room temperature. Reaction times range from about 10 minutes to about 4 hours. If desired, the reaction may be conducted in the presence of an inert organic solvent and, when present, the maximum temperature employable is limited only by the reflux temperature of the mixture. Although the reaction may be effected at superatmospheric pressure, it is preferred to conduct the reaction at atmospheric pressure.

As illustrated by the equation below, showing reaction of 1,7-bis(perfluorooctanoyl)-1,4,7-triazaheptane as the fluorinated polyamide reactant with cyanuric chloride as the halogenated triazine reactant, the reaction yields as by-product the halide salt of the fluorinated polyamide reactant:

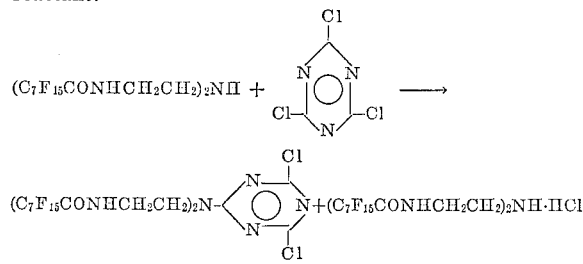

Upon conclusion of the reaction the desired product can be extracted from the reaction mixture using a suitable solvent, such as ether, acetone, acetonitrile, and the like, and can be purified as, e.g. by fractional crystallization. In a preferred embodiment the reaction is carried out in an acetone medium. Acetone dissolves the starting materials and the desired product, but not the by-product salt. Thus, recovery of the desired product is facilitated in that, upon completion of the reaction, the py-product halide salt can be simply removed by filtration of the reaction mixture. The amide salt by-product can be reconverted to the fluorinated polyamide starting material in known manner by treatment with an appropriate ion exchange resin or with an aqueous base, such as aqueous sodium hydroxide.

If desired, the reaction may be carried out in the presence of an acid-interceptor, such as sodium bicarbonate, to thereby reduce the amount of by-product amide salt formed in the reaction.

The alkylene linkage ($C_xH_{2x}$) in the novel compounds of the present invention may be a straight-chain or branched-chain group, preferably containing from 2 to 4 carbon atoms.

The $R_f$ groups in the novel fluorocarbon derivatives of the present invention represented by Formula I, above, may be the same or different. When the $R_f$ group is a perfluoroalkyl group, it may be straight-chain or branched-chain, preferably containing from 6 to 14 carbon atoms.

When the $R_f$ group is a fluorinated isoalkoxyalkyl group represented by Formula IV, above, then, in the

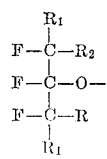

moiety, $R_1$ and $R_2$ are preferably fluorine or perfluoroalkyl groups. When perfluoroalkyl groups, $R_1$ and $R_2$ preferably contain 1–2 carbon atoms. When the $R_1$ and $R_2$ groups contain hydrogen substitution, the atomic ratio of fluorine to hydrogen is at least 1:1.

In preferred embodiments integer $m$ in the $R_f$ radical of Formula IV, above, is at least 1, and the sum of $m$ and $n$ is preferably from 1 to 10. Specific examples of preferred embodiments of the preferred

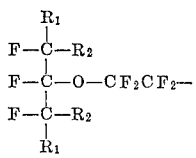

moiety of $R_f$ radicals of the compounds of the present invention include the following:

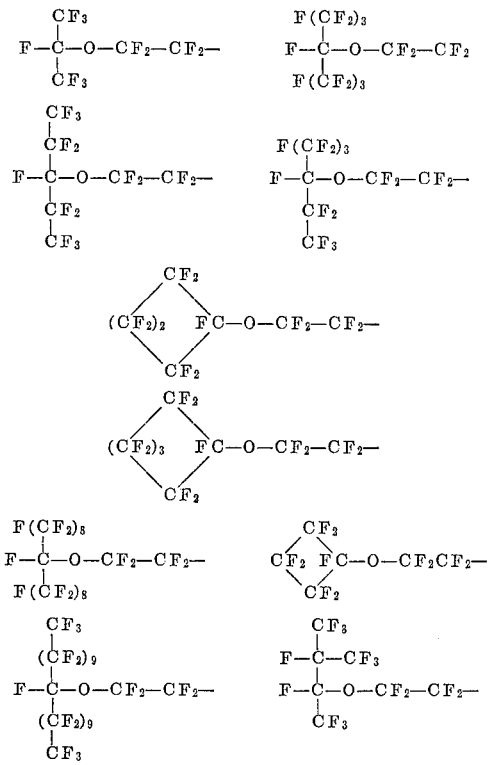

Compounds corresponding to the formula

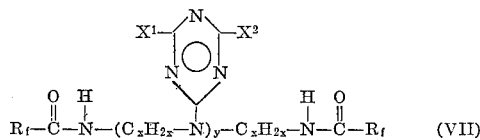

wherein $R_f$, $X_1$, $X_2$ and $y$ have the afore-stated meanings and $x$ is an integer from 2 to 4, constitute preferred embodiments of the present invention, those wherein $X^1$ and $X^2$ are both chlorine being most preferred.

A specific class of preferred embodiments of the present invention are compounds according to Formula VII, above, wherein the $R_f$ radical has the formula

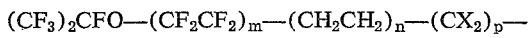

wherein $m$ is an integer from 1 to 10, n is an integer from 0 to 10, with the proviso that the sum of $m$ and $n$ is from 1 to 10, and wherein X and p have the afore-stated meanings.

The following examples relate to the preparation of representative compounds of the present invention but are not intended to be limiting on the scope thereof.

Example 1

Solid 1,7 - di-n-perfluorooctanoyl - 1,4,7-triazaheptane (4.5 g., 0.005 mol) is dissolved in 60 ml. of acetone. This solution is cooled to 18° C. and 0.46 g. (0.0025 mol) of cyanuric chloride is added in one portion under constant stirring. The mixture is then stirred for 3 hours at 18° C., after which time the insoluble by-product amide salt is removed by filtration. The filtrate is evaporated to dryness, and the residue is recrystallized twice from acetonitrile to give 1.4 g. of the colorless solid product 1,7-bis-(perfluorooctanoyl)-4-(4,6-dichloro-1,3,5-triazin-2-yl) - 1, 4,7-triazaheptane, M.P. 181°–183.5° C., in 27% conversion and 54% yield, having the structural formula

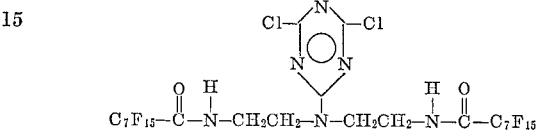

Elemental analysis of that product compares as follows with calculated composition of $C_3H_{10}N_6Cl_2O_2F_{30}$:

Analysis (percent): C, 26.4; H, 0.96; N, 8.05; Cl, 6.8; F, 54.65. Calculated (percent): C, 26.2; H, 1.1; N, 8.0; Cl, 6.7; F, 55.0.

Infra-red analysis of the product shows medium to strong absorption bands at about 2.99, 5.85, 6.35, 6.48, 6.75, 6.97, 7.9 to 8.85 (envelope), 9.45, 10.18, 11.75, 12.46 and 13.8$\mu$. The absorption bands at 6.48, 6.97, 7.3 and 12.46$\mu$ are characteristic of s-triazines. The 11.75$\mu$ absorption band is characteristic for 4,6-dichloro triazine. These, together with NH stretch at 2.95$\mu$ and amide bands at 5.85 and 6.35$\mu$ establishing the presence of the secondary amide functionality, confirm assigned structure.

The perfluoroalkyl diamide reactant is prepared in the following manner:

A solution of 49 grams (0.475 mol) of diethylene triamine in 60 ml. of diethyl ether is placed in a reaction vessel equipped with a dropping funnel, condenser, magnetic stirrer and a calcium chloride drying tube. After chilling the vessel in an ice water bath for a period of about 20 minutes, 34.2 grams (0.079 mol) of n-perfluorooctanoyl chloride is added with stirring to the contents of the vessel during a 30 minute period. After the addition of the n-perfluorooctanoyl chloride reactant is complete, the ice water bath is removed and the stirring is continued at room temperature for a period of 20 minutes. Thereafter, 100 ml. of an 8% aqueous sodium hydroxide solution is added to the reaction mixture and the stirring is continued for an additional 15 minutes. The resulting gelatinous precipitate is filtered at reduced pressure and washed with water. After air drying the precipitate, a yield of about 30 grams of 1,7-di-n-prefluorooctanoyl-1,4,7-triazaheptane, a white solid (melting point 94–97° C.), having the following structure formula is obtained:

Example 2

Following the procedure of Example 1 there is reacted 1,9 - di-n-perfluorooctanoyl-1,5,9-triazanonane with cyanuric chloride to obtain as product the compound

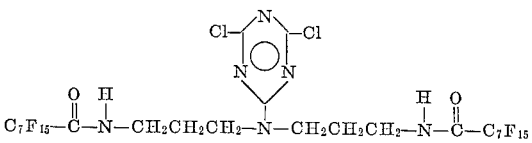

The perfluoroalkyl diamide reactant is prepared in the following manner:

To a solution of 20 grams (0.0467 mol) of methyl-n-perfluorooctanoate in 25 ml. of diethyl ether, there is added 3.07 grams (0.0235 mol) of di-n-propylene triamine.

The resulting solution is heated under reflux temperature for a period of 24 hours. After removal of the solvent under reduced pressure, 16.6 grams of a light yellow oil which solidifies in about 30 minutes to give a white sticky solid is obtained. The white sticky solid is recrystallized from acetonitrile to yield 1,9-di-n-perfluorooctanoyl-1,5,9-triazanonane (a white powder melting at 84–85° C. having the following structural formula:

$$C_7F_{15}-\overset{O}{\overset{\|}{C}}-NHCH_2CH_2CH_2NHCH_2CH_2CH_3NH-\overset{O}{\overset{\|}{C}}-C_7F_{15}$$

Example 3

Following the procedure set forth in Example 1 there is reacted 1,10-di-n-perfluorooctanoyl-1,4,7,10-tetraazadecane with cyanuric chloride to obtain as product the compound $$C_7F_{15}-\overset{O}{\overset{\|}{C}}-\overset{H}{\overset{|}{N}}-(CH_2CH_2N)_2-CH_2CH_2-\overset{H}{\overset{|}{N}}-\overset{O}{\overset{\|}{C}}-C_7H_{15}$$

with triazine ring substituted Cl, Cl.

The perfluoroalkyl diamide reactant is prepared in the following manner:

To a solution of 20 grams (0.0467 mol) of methyl-n-perfluorooctanoate in 25 ml. of diethyl ether, there is added 3.4 grams (0.0233 mol) of triethylene tetramine. The resulting solution is heated under reflux temperature for a period of 24 hours. After removal of the solvent under reduced pressure, 20 grams of a white sticky solid is obtained which is subsequently recrystallized from acetonitrile. The product of this reaction is 1,10-di-n-perfluorooctanoyl-1,4,7,10-tetraazadecane, a white powder (melting point 89–92° C.) having the following structural formula:

$$C_7F_{15}-\overset{O}{\overset{\|}{C}}-\overset{H}{\overset{|}{N}}-CH_2CH_2-\overset{H}{\overset{|}{N}}-CH_2CH_2-\overset{H}{\overset{|}{N}}-CH_2CH_2-\overset{H}{\overset{|}{N}}-\overset{O}{\overset{\|}{C}}-C_7F_{15}$$

Example 4

To a solution of 16 grams (0.037 mol) of methyl perfluorooctanoate in 20 ml. of diethyl ether there is added 3.5 grams (0.018 mol) of tetraethylene pentamine. The resulting solution is heated to reflux temperature for a period of 3 hours. After removal of the diethyl ether solvent under reduced pressure there remains a viscous yellow oil which does not solidify on standing. This oil is dissolved in 300 ml. of acetone, the solution is stirred, and 5.5 g. (0.03 mol) of cyanuric chloride is added thereto. Stirring at 15–20° C. is continued for a period of 4 hours after which time the solution is filtered to remove insoluble amide salt by-product. The filtrate is evaporated to dryness, and the residue is recrystallized twice from acetonitrile to yield as product the compound:

$$C_7F_{15}-\overset{O}{\overset{\|}{C}}-\overset{H}{\overset{|}{N}}-(CH_2CH_2N)_3-CH_2CH_2-\overset{H}{\overset{|}{N}}-\overset{O}{\overset{\|}{C}}-C_7F_{15}$$

with triazine Cl, Cl substituted.

Example 5

Following the procedure set forth in Example 1 there is reacted the amide $$[(CF_3)_2CFO-(CF_2)_5CONHC_3H_6]_2NH$$

with cyanuric chloride to obtain as product the compound $$[(CF_3)_2CFO-(CF_2)_5CONHC_3H_6]_2N-\text{(triazine-Cl,Cl)}$$

The amide reactant is prepared in the following manner:

To a solution of 24.7 g. (0.05 mol) of $$(CF_3)_2CFO-(CF_2)_5-COOCH_3$$

in 25 ml. of diethyl ether there is added 3.07 g. (0.0235 mol) of di-n-propylene triamine. The resulting solution is refluxed for a period of 24 hours. After removal of the solvent under reduced pressure there is obtained as residue the crude product $$[(CF_3)_2CFO-(CF_2)_5-CONHC_3H_6]_2NH$$

which can be purified by recrystallization from acetonitrile.

In a manner analogous to that described in the above examples, other compounds illustrative of the present invention may be prepared as follows:

$$CF_3(CF_2)_4-\overset{O}{\overset{\|}{C}}-NHC_2H_4NC_2H_4\overset{H}{\overset{|}{N}}-\overset{O}{\overset{\|}{C}}-(CF_2)_4CF_3$$

with triazine F, F substituted by reaction of 1,7-di-n-perfluorohexanoyl-1,4,7-triazeheptane with 2-chloro-4,6-difluoro triazine.

$$F-\overset{CF_3}{\overset{|}{C}}F_2(CF_2)_2-\overset{O}{\overset{\|}{C}}-NHC_2H_4NC_2H_4\overset{H}{\overset{|}{N}}-\overset{O}{\overset{\|}{C}}-(CF_2)_2CF_2-\overset{CF_3}{\overset{|}{C}}-F$$
(with CF_3 substituents)

with triazine Cl, F substituted by reaction of 1,7-bis-[perfluoro(5-methylhexanoyl)]-1,4,7-triazaheptane with 2-fluoro-4,6-dichloro triazine.

$$F-\overset{CF_3}{\overset{|}{C}}F_2\overset{CF_3}{\overset{|}{C}}F(CF_2)_2-\overset{O}{\overset{\|}{C}}-NHC_2H_4NC_2H_4\overset{H}{\overset{|}{N}}=\overset{O}{\overset{\|}{C}}-(CF_2)_2\overset{CF_3}{\overset{|}{C}}CF_2-\overset{CF_3}{\overset{|}{C}}-F$$

with triazine F, Br substituted by reaction of 1,7-bis-[perfluoro(4,6-dimethylheptanoyl)]-1,4,7-triazaheptane with 2-fluoro-4,6-dibromo triazine.

$$CF_3(CF_2)_{12}-\overset{O}{\overset{\|}{C}}-NHC_2H_4NC_2H_4\overset{H}{\overset{|}{N}}-\overset{O}{\overset{\|}{C}}-(CF_2)_{12}CF_3$$

with triazine Cl, Br substituted by reaction of 1,7-di-n-perfluorotetradecanoyl-1,4,7-triazaheptane with 2-chloro-4,6-dibromo triazine.

$$CF_3(CF_2)_{14}-\overset{O}{\overset{\|}{C}}-NHC_2H_4NC_2H_4\overset{H}{\overset{|}{N}}-\overset{O}{\overset{\|}{C}}-(CF_2)_{14}CF_3$$

with triazine Br, Br substituted by reaction of 1,7-di-n-perfluorohexadecanoyl-1,4,7-triazaheptane with cyanuric bromide.

$$CF_3(CF_2)_7-\overset{O}{\overset{\|}{C}}-NH(C_2H_4N)_2C_2H_4\overset{H}{\overset{|}{N}}-\overset{O}{\overset{\|}{C}}-(CF_2)_7CF_3$$

with triazine Cl, Cl substituted by reaction of 1,10-di-n-perfluorononanoyl-1,4,7-tetraazadecane with cyanuric chloride.

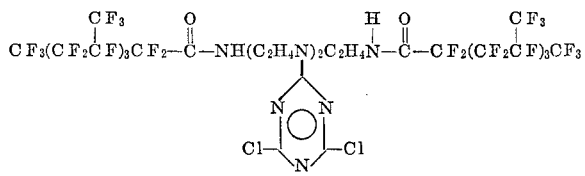

by reaction of 1,10-bis-[perfluoro(3,5,7-trimethylnonanoyl)]-1,4,7,10-tetraazadecane with cyanuric chloride.

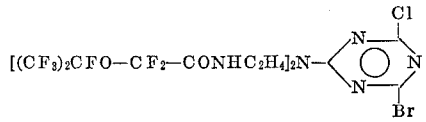

by reaction of 1,7-bis-[perfluoro(3-oxa-4-methylpentanoyl)]-1,4,7-triazaheptane with 2-chloro-4,6-dibromo triazine.

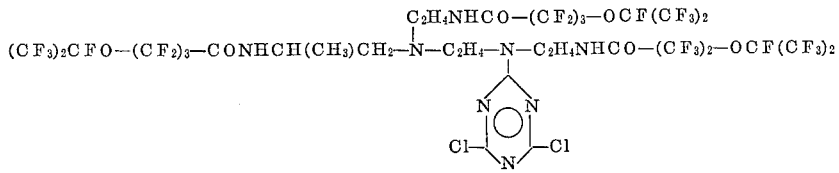

by reaction of 1,10-bis[perfluoro(5-oxa-6-methylheptanoyl)]-2-methyl-4-{2-[perfluoro(5-oxa-6-methylheptanamide)]ethyl}-1,4,7,10-tetraazadecane with cyanuric chloride.

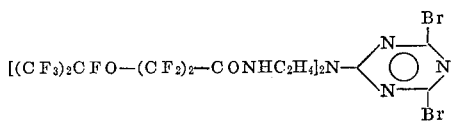

by reaction of 1,7-bis[2,2,3,3-tetrahydroperfluoro(6-oxa-7-methyloctanoyl)]-1,4,7-triazaheptane with cyanuric bromide.

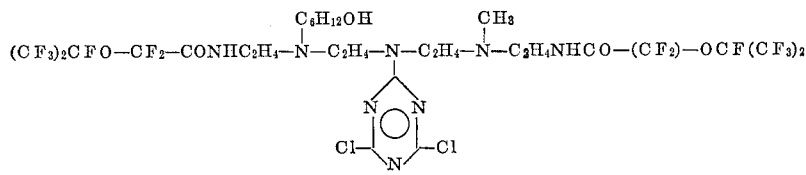

by reaction of 1,13-bis[perfluoro(3-oxa-4-methylpentanoyl)]-4-(6-hydroxyhexyl)-10-methyl-1,4,7,10,13-pentazatridecane with cyanuric chloride.

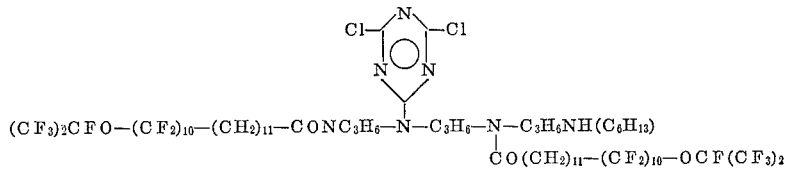

by reaction of 1,9-bis[12-perfluoro(11-oxa-12-methyl-tridecyl)dodecanoyl]-3-hexyl-1,5,9,13-tetraazatridecane with cyanuric chloride.

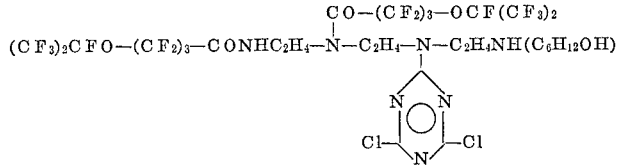

by reaction of 1,4-bis[pentafluoro(5-oxa-6-methylheptanoyl)]-10l(6-hydroxyhexyl)-1,4,7,10-tetraazadecane with cyanuric chloride.

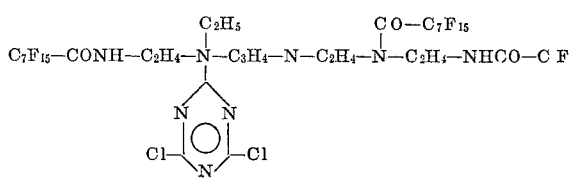

by reaction of 1,10,13-tris(perfluorooctanoyl)-4-ethyl-1,4,7,10,13-pentaazatridecane with cyanuric chloride.

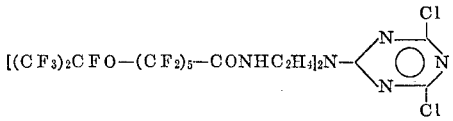

by reaction of 1,7-bis[perfluoro(7-oxa-8-methylnonanoyl)]-1,4,7-triazaheptane with cyanuric chloride.

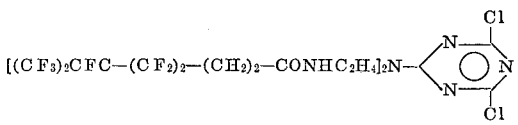

by reaction of 1,7-bis[2,2,3,3-tetrahydroperfluoro(6-oxa-

7 - methyloctanoyl)] - 1,4,7 - triazaheptane with cyanuric chloride.

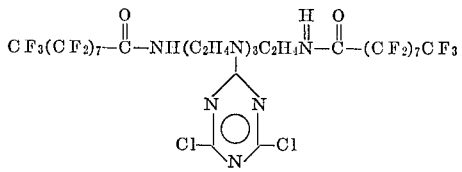

by reaction of 1,13 di-n-perfluorononanoyl-1,4,7,10,13-pentaazatridecane with cyanuric chloride.

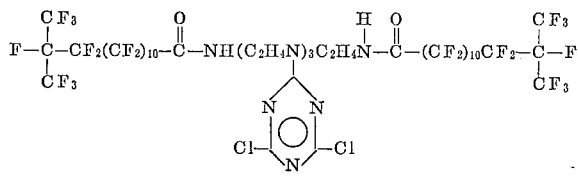

by reaction of 1,13-bis[perfluoro(13-methyltetradecanoyl)]-1,4,7,10,13-pentaazatridecane with cyanuric chloride.

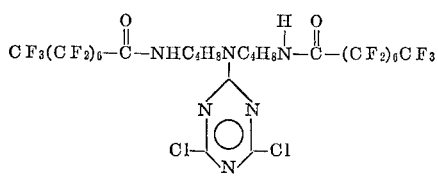

by reaction of 1,11-di-n-perfluorooctanoyl-1,6,11-triazaundecane with cyanuric chloride.

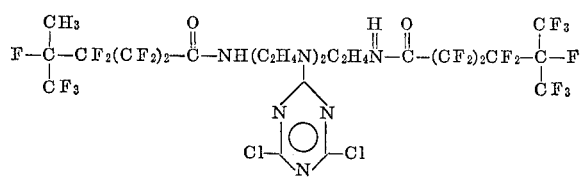

by reaction of 1,13-bis[perfluoro(5 - methylhexanoyl)]-1,5,9,13-tetraazatridecane with cyanuric chloride.

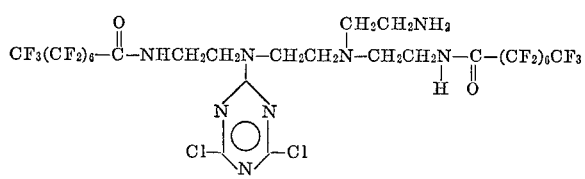

by reaction of 1,10-n-diperfluorooctanoyl - 7 - (2 - aminoethyl)-1,4,7,10-tetraazadecane with cyanuric chloride.

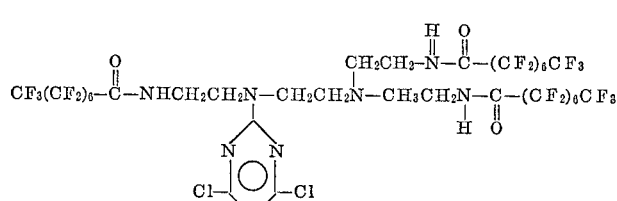

by reaction of 1,10-n-diperfluorooctanoyl-7-(2-n-perfluorooctanamidoethyl)-1,4,7,10-tetraazadecane with cyanuric chloride.

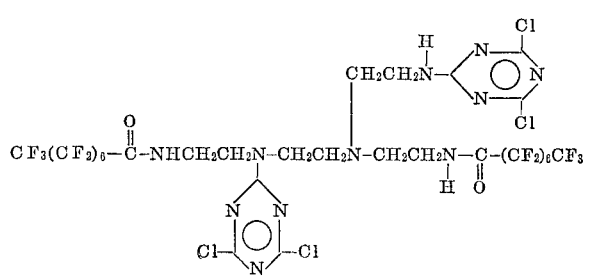

by reaction of 1,10-n-diperfluorooctanoyl - 7 - (2 - aminoethyl)-1,4,7,10-tetrazadecane with cyanuric chloride.

The oil- and water-repellent compounds of the invention are useful in treating paper as well as textiles (fabrics and fibers) comprised of natural or synthetic fibers including cotton, nylon, wool, polyethylene terephthalate and polyacrylonitrile. The fluorocarbon derivatives of the invention are especially useful in the treatment of fabrics and fibers comprised of cellulose and certain cellulosic derivatives which contain cellulosic hydroxyl groups such as cotton, linen, viscose, cupra ammonium rayon, saponified cellulose acetate and salts of cellulose xanthate. The invention is also applicable to the treatment of blends of natural and/or synthetic fibers in cloth, for example, blends containing polyethylene terephthalate, polyacrylonitrile, nylon, cotton and wool. If desired, auxiliary agents such as those imparting crease resistance and softening properties may be applied in conjunction with the fluorocarbon chemicals of the invention. In addition, other materials such as the surfaces of wood, plastics, glass and metals may be treated with solutions containing the fluorocarbon derivatives of the invention to render the same oil- and water-repellent.

The fluorocarbon derivatives of the present invention may be applied to the article to be rendered oil-repellent by treating the same with a solution of the repellent and evaporating the solvent. If desired, the treated article may then be cured at an elevated temperature. The concentration of the fluorocarbon derivative on the treated article generally may vary from about 0.5% to 10%, preferably 1.0% to 4.0%, based on the weight of the article. Since the solvent used in formulating the oil- and water-repellent composition functions essentially as a carrier for the fluorocarbon derivative, any organic liquid inert to the repellent and to the articles to be treated and capable of dissolution of the requisite amount of oil- and water-repellency agent may be employed. Acetone, methyl ethyl ketone, acetonitrile and dimethylformamide are illustrative solvents which may be used in preparing the oil- and water-repellent compositions. Alternatively, aqueous emulsions of the oil- and water-repellent may be applied onto the articles to be treated by conventional aqueous application methods.

The solvent may be evaporated by air drying at room temperature. If it is desired to cure the treated articles the solvent may be evaporated prior to curing or during curing of the oil- and water-repellent chemical onto the article. Preferably, the article treated with a solution of the fluorocarbon derivative is air dried prior to curing for a time sufficient to evaporate essentially all of the solvent. Thereafter, the article having on its surface the oil- and water-repellent chemical is cured or "heat-set" at a temperature of about 100° C. to 160° C. for a time period varying inversely with the temperature, ranging from about 1 second to 5 minutes.

When cellulosic materials are to be rendered oil- and water-repellent, the fluorocarbon derivatives of the present invention are preferably applied thereto from an aqueous solution or an aqueous emulsion and in the presence of a basic catalyst. The cellulosic material is moistened with an aqueous solution of the basic catalyst, air dried to remove residual water and then impregnated with an aqueous solution or emulsion of the fluorocarbon derivative of the invention for a time, normally 30 seconds to about 30 minutes, sufficient to retain on the cellulosic material about 1 to 10%, preferably 2 to 4% of the fluorocarbon derivative, based on the weight of the cellulosic material. The thusly impregnated cellulosic material is then heated at a temperature of 100° C. to 165° C. for a time period varying inversely with the temperature ranging from about 15 minutes to 30 seconds. After the reaction of the fluorocarbon derivative with the cellulosic material is complete, the chemically modified cellulosic material is washed free of excess catalyst with water and dried.

Various modifications of the above-described treatment may also be employed without departing from the spirit of the invention. For example, the cellulosic material may be first impregnated with an aqueous solution or emulsion of the fluorocarbon derivative, then treated with an aqueous solution of the basic catalyst, air dried and finally heated to effect reaction of the fluorocarbon derivative with the cellulosic material. Another modification of the above-described procedure involves premixing the aqueous solution or emulsion of the fluorocarbon derivative together with the basic catalyst prior to impregnation of the cellulosic material. Chemical modification of the cellulosic material under anhydrous conditions, as in the presence of solvents capable of penetrating cellulosic fibers such as benzene, chloroform, dioxane and acetone, constitutes still another variation of the afore-described procedures.

In general, suitable basic catalysts should have a dissociation constant in water of at least $1.8 \times 10^{-5}$ at 25° C. Phosphates, carbonates and hydroxides of alkali metals such as sodium phosphate, sodium carbonate, sodium hydroxide and potassium hydroxide; alkaline-earth metal hydroxides including calcium hydroxide and magnesium hydroxide; an quarternary ammonium hyroxides such as tetraethyl ammonium hydroxide and benzyl trimethyl ammonium hydroxide are illustrative of preferred effective basic catalysts. The catalyst concentration is normally dependent upon the strength of the base selected, speed of reaction desired and the nature of the cellulosic material to be treated. In general, catalyst concentrations of about 1 to 20%, preferably 2 to 5%, based on the weight of the solution are satisfactory.

Results of tests relating to the evaluation of a typical fluorocarbon derivative composition of the present invention as oil- and water-repellency agent on textiles are shown below.

The procedure employed in determining the oil-repellency ratings on textiles is described, for example, on pages 323–4 of the April, 1962 edition of the Textile Research Journal. This procedure involves gently placing on the treated fabric drops of mixtures of mineral oil (Nujol) and n-heptane in varying proportions. The drops are allowed to stand on the treated fabric undisturbed for 3 minutes. After the 3 minute time period the wetting and penetration of the fabric is visually observed. Referring to following Table I, the number corresponding to the mixture containing the highest percentage of heptane which does not penetrate or wet the fabric is considered to be the oil-repellency rating of the treated fabric.

TABLE I

| Oil repellency rating: | Percent mineral oil [a] | Percent n-heptane [b] |
|---|---|---|
| 150 | 0 | 100 |
| 140 | 10 | 90 |
| 130 | 20 | 80 |
| 120 | 30 | 70 |
| 110 | 40 | 60 |
| 100 | 50 | 50 |
| 90 | 60 | 50 |
| 80 | 70 | 30 |
| 70 | 80 | 20 |
| 60 | 90 | 10 |
| 50 | 100 | 0 |
| 0 | [c] | [c] |

[a] "Nujol" Saybolt viscosity 360/390 at 100° F. Specific gravity 0.880/0.900 at 60° F. Percent by volume at 20° C.
[b] Heptane B.P. 98–99° C. Percent by volume at 20° C.
[c] No holdout to mineral oil.

When typical oily staining materials are dropped onto treated fabrics and subsequently blotted off, those fabrics with an oil-repellency rating of at least about 50–70 will exhibit acceptable resistance to staining; those fabrics with an oil-repellency rating of 80–90 will have good resistance to staining; and those with an oil-repellency rating of 100 and up will give excellent resistance.

Hydrophobic properties of the treated cloth were determined by Method 22–1961 of the American Association of Textile Chemists and Colorists which is described, for example, on pages 152–153 of the Technical Manual and Yearbook of that association for the year 1961. It is to be noted that this method provides for no interpolation of results which are reported as one of the Standard Spray Test ratings which are the six ratings 0, 50, 70, 80, 90 and 100.

Wash fastness of the treated cloth was determined by subjecting the cloth to repeated launderings in hot water in a household automatic washing machine using a heavy-duty detergent, followed by drying in an automatic dryer. The material was ironed prior to testing.

The results obtained are set forth in Table II below:

TABLE II

| Specimen | Loading, percent by weight | Oil repellency after launderings | | | Water repellency after launderings | | |
|---|---|---|---|---|---|---|---|
| | | 0 | 1 | 2 | 0 | 1 | 2 |
| (a) | 2.00 | 100 | 60 | 60 | 80 | 80 | 70 |
| (b) | 2.41 | 90 | 60 | 50 | 70 | 70 | 50 |
| (c) | 2.46 | 90 | 50 | 50 | 50 | 50 | 50 |
| (d) | 3.53 | 90 | 60 | | 50 | 50 | |

NOTE.—The test specimens, pieces of 80 x 80 count white cotton print cloth, were treated with a 4% solution of 1,7-di-n-(perfluorooctanoyl)-4-(4,6-dichloro-1,3,5-triazin-2-yl)-1,4,7-triazaheptane in acetone as follows:
 (a) The cloth was dipped in 5% aqueous sodium hydroxide solution for 3 minutes and then air dried for a period of 30 minutes. The air dried cloth was impregnated by total immersion in the acetone solution of the fluorocarbon compound for 2 minutes. The wet test piece thus impregnated was wrung in a wringer to remove excess solution and was then heated in an oven at 150° C. for 5 minutes, and was ironed. Loading (amount of fluorocarbon derivative retained in the cloth) was determined by weighing the cloth before and after treatment. Prior to tests all specimens were conditioned at 50% R.H.
 (b) Same as in (a), except that after impregnation and before heating the cloth was not wrung, but instead was blotted in paper toweling.
 (c) Same as in (a), except that treatment with 5% aqueous sodium hydroxide was omitted.
 (d) Same as in (c), except that the heating step following impregnation was omitted, and instead the cloth was air dried overnight.

Results of tests relating to the evaluation of a typical fluorocarbon derivative composition of the present invention as oil-, water- and ink-repellency agent on paper are shown in the following. All tests were conducted on hand sheets formed of 50/50 softwood-hardwood bleached kraft pulp beaten to 400 ml. Canadian Standard freeness, both unsized and internally rosin sized.

The procedure employed in determining the oil-repellency ratings on paper is described, for example, in a Technical Bulletin issued by the Minnesota Mining and Manufacturing Company, entitled "Paper Chemical FC-805—IV Properties of Treated Paper-C. Oil Resistance-2. Comparative Kit Test." This procedure involves gently placing on treated paper drops of mixtures of castor oil, toluene and heptane in varying proportions. The drops are allowed to stand on the treated paper undisturbed for 15 seconds. After the 15 second period the wetting and penetration of the paper is visually observed. Failure is detected by pronounced darkening caused by penetration. The darkening of even a small fraction of the area under the drop is considered failure. With reference to Table III, below, the number corresponding to the mixture containing the highest percentage of heptane which does not penetrate or wet the paper is the "Kit Number" of the paper and is considered to be the oil-repellency rating of the treated paper.

TABLE III

| Kit No.: | Volume castor oil | Volume toluene | Volume heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

Papers having a "Kit Number" of 5 or below will exhibit only fair oil-repellency; those papers having a "Kit Number" of 8–10 will have good oil-repellency; and those having a "Kit Number" of 10 or above will have excellent oil-repellency.

Water-repellency of the treated paper is determined by the so-called "Cobb Size" method, TAPPI Standard T–441. In this method a weighed specimen of paper is placed under a metal ring of known area. Water is placed in the ring and is allowed to stand on the face of the test paper for 3 minutes. The water is then decanted, the paper specimen is blotted to remove free surface water and is weighed to determine the amount of water absorbed. Results are reported in terms of grams of water absorbed per square meter of exposed surface. Papers having a Cobb Size number of 40 to 60 have fair water-repellency, those having a Cobb Size number of 30–40 have good water-repellency, and those having a Cobb Size number of 30 or lower have excellent water-repellency.

The resistance of the treated paper to ink penetration is determined by TAPPI Routine Control Method RC–14. In that method a 1.5 inch square piece of paper, its edges turned up, is floated on standard writing ink (Schaeffer's Skrip Permanent Blue-Black Ink #232 was used in these tests), and the time required for the ink to evenly penetrate to the upper surface of the paper is measured in seconds.

Pieces of unsized and internally rosin sized paper were treated with 1,7 - bis(perfluorooctanoyl) - 4 - (4,6-dichloro - 1,3,5 - triazin - 2 - yl) - 1,4,7 - triazaheptane by total immersion in solutions of varying concentrations of the repellent in acetone for a period of 60 seconds. Excess solution was removed by blotting with blotting paper, and the sheets were dried in a rotary handsheet drier for a period of 1.5 minutes. Prior to testing the paper so treated was conditioned at 50% R.H. at 72° F. for a period of at least 72 hours.

The results of the "Kit Test," Cobb Size Test and Ink Flotation Test are summarized in Table IV below:

TABLE IV

| Specimen | Percent of repellent in acetone solution | Kit No. | Cobb Size No. | Ink flotation, seconds |
|---|---|---|---|---|
| Unsized paper | 0.4 | 8 | 44 | 360 |
|  | 0.22 | 7 | 51 | 270 |
|  | 0.11 | 5 | 94 | 70 |
|  | 0.04 | 5 | 132 | 30 |
| Internally rosin sized paper | 0.4 | 6 | 32 | 800 |
|  | 0.22 | 5 | 32 | 720 |
|  | 0.11 | 4 | 32 | 720 |
|  | 0.05 | 3 | 34 | 360 |

When other fluorocarbon compounds within the scope of the present invention are applied to textiles and paper in the above-described manner similar results are obtained, that is to say oil- and water-repellency is imparted to the textiles and paper so treated.

From the foregoing it is apparent that we have discovered a series of novel and valuable compounds which are effective oil- and water-repellent agents.

Since various changes and modifications may be made in the invention without departing from the spirit thereof, it is intended that all matter contained in he above description shall be interpreted as illustrative and not in a limiting sense.

We claim:
1. A compound having the structural formula

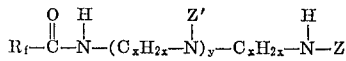

$$R_f-\overset{O}{\overset{\|}{C}}-\overset{H}{\overset{|}{N}}-(C_xH_{2x}-\overset{Z'}{\overset{|}{N}})_y-C_xH_{2x}-\overset{H}{\overset{|}{N}}-Z$$

wherein
(1) $R_f$ is a radical selected from the group consisting of
  (a) perfluoroalkyl having from 3 to 17 carbon atoms, and
  (b) a radical having the formula

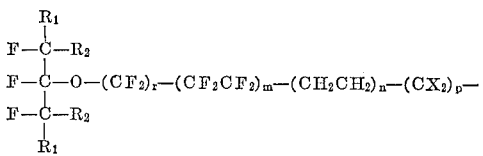

$$\begin{array}{c}R_1\\|\\F-C-R_2\\|\\F-C-O-(CF_2)_r-(CF_2CF_2)_m-(CH_2CH_2)_n-(CX_2)_p-\\|\\F-C-R_2\\|\\R_1\end{array}$$

wherein
  (i) $R_1$ and $R_2$ are fluorine or are fluoroalkyl groups, or when taken together, are fluoroalkylene groups forming a cycloaliphatic structure, which $R_1$ and $R_2$ groups may each have from 1 to 9 carbon atoms, provided that not more than three of the $R_1$ and $R_2$ groups may be fluoroalkyl groups,
  (ii) $m$ and $n$ are each integers of from 0 to 20, with the proviso that the sum of $m$ and $n$ is from 0 to 20, and provided further that when $r$ is 0, $m$ is at least 1,
  (iii) X is selected from the group consisting of hydrogen and fluorine, with the proviso that when $n$ is greater than 0, then X is always hydrogen,
  (iv) $p$ is 0 or 1,
  (v) $r$ is 0 or 1, with the proviso that when the sum of $m$, $n$ and $p$ is greater than 0, then $r$ is always 0,
(2) $x$ is an integer from 2 to 6,
(3) $y$ is an integer from 1 to 4,
(4) Z is a member selected from the group consisting of
  (a) hydrogen,
  (b) alkyl having from 1 to 6 carbon atoms,
  (c) a radical having the formula —ROH wherein R is a divalent alkylene bridging group containing from 1 to 6 carbon atoms,
  (d) fluorinated acyl radical having the formula

$$-\overset{O}{\overset{\|}{C}}-R_f$$

wherein $R_f$ has the afore-stated meaning, and
  (e) a halogenated triazinyl radical having the formula

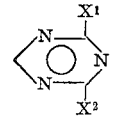

in which $X^1$ and $X^2$ are independently selected from the group consisting of fluorine, chlorine and bromine, and
(5) Z', which may be the same or different in different

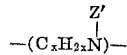

$$-(C_xH_{2x}\overset{Z'}{\overset{|}{N}})-$$

groups, is a member selected from the group consisting of
  (a) hydrogen,
  (b) alkyl having from 1 to 6 carbon atoms,
  (c) a radical having the formula —ROH wherein R is a divalent alkylene bridging group containing from 1 to 6 carbon atoms, (d) a fluorinated acyl radical having the formula

wherein $R_f$ has the afore-stated meaning,
(e) a halogenated triazinyl radical having the formula

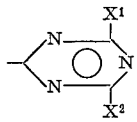

in which $X^1$ and $X^2$ have the afore-stated meanings, and
(f) a radical having the formula

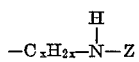

wherein $x$ and $Z$ have the afore-stated meanings, with the proviso that at least one of Z or Z′ is a fluorinated acyl radical or one of Z′ is a radical having the formula

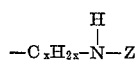

wherein Z is a fluorinated acyl radical, and at least one of Z or Z′ is a halogenated triazinyl radical or one of Z′ is a radical having the formula

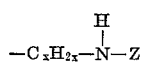

wherein Z is a halogenated triazinyl radical, said fluorinated acyl radical and halogenated triazinyl radical having afore-stated formulas.

2. A compound according to claim 1 having the structural formula

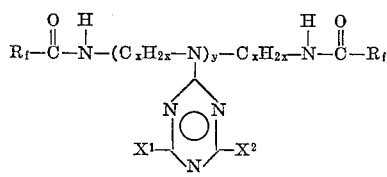

wherein $R_f$, $X^1$, $X^2$ and $y$ have the meanings given in claim 1 and $x$ is an integer from 2 to 4.

3. A compound according to claim 2 wherein $R_f$ is a perfluoroalkyl radical having from 6 to 14 carbon atoms.

4. A compound according to claim 3 wherein $X^1$ and $X^2$ are both chlorine.

5. A compound according to claim 4 having the structural formula

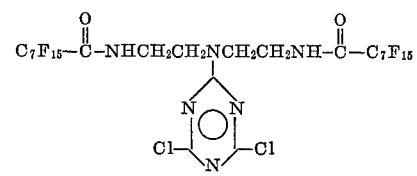

6. A compound according to claim 4 having the structural formula

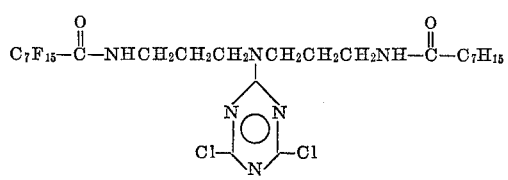

7. A compound according to claim 4 having the structural formula

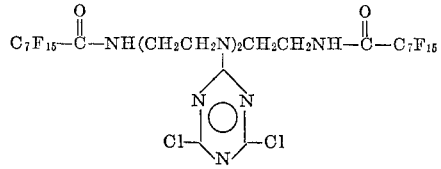

8. A compound according to claim 4 having the structural formula

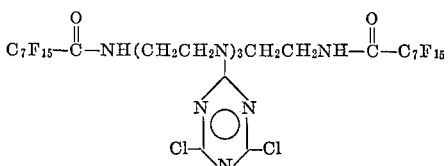

9. A compound according to claim 1 having the structural formula

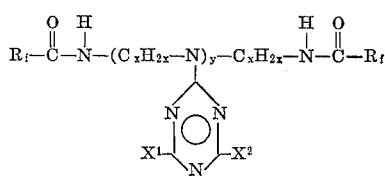

wherein $X^1$, $X^2$ and $y$ have the meanings given in claim 1, $x$ is an integer from 2 to 4, and $R_f$ is a radical having the formula

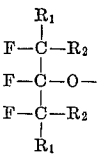

wherein $R_1$, $R_2$, $m$, $n$, $r$, $p$ and $X$ have the meanings given in claim 1.

10. A compound according to claim 9 wherein the $R_f$ radical has the formula $$(CF_3)_2CFO—(CF_2CF_2)_m—(CH_2CH_2)_n—(CX_2)_p—$$

wherein $X$ and $p$ have the meanings given in claim 9, wherein $m$ is an integer from 1 to 10 and $n$ is an integer from 0 to 10, with the proviso that the sum of $m$ and $n$ is from 1 to 10.

11. A compound according to claim 10 wherein $X^1$ and $X^2$ are both chlorine.

12. A compound according to claim 11 having the structural formula

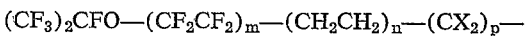

13. A compound according to claim 11 having the structural formula

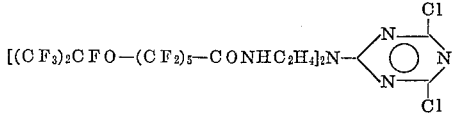

References Cited
UNITED STATES PATENTS 3,455,892  7/1969  Froehlich _____ 260—249.5 XR HENRY R. JILES, Primary Examiner J. M. FORD, Assistant Examiner U.S. Cl. X.R.

117—135.5, 154; 260—248, 561, 544, 539, 614